US011629808B2

(12) United States Patent
Liu et al.

(10) Patent No.: US 11,629,808 B2
(45) Date of Patent: Apr. 18, 2023

(54) MOUNTING MEMBER AND DEVICE ASSEMBLY

(71) Applicant: Danfoss (Tianjin) Ltd., Tianjin (CN)

(72) Inventors: Peng Liu, Tianjin (CN); Xiaojing Zhou, Tianjin (CN); Tao Wang, Tianjin (CN); Liang Fan, Tianjin (CN); Ying Dong, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 238 days.

(21) Appl. No.: 16/861,423

(22) Filed: Apr. 29, 2020

(65) Prior Publication Data
US 2020/0347981 A1 Nov. 5, 2020

(30) Foreign Application Priority Data
Apr. 30, 2019 (CN) .......................... 201910370177.3

(51) Int. Cl.
*F16M 5/00* (2006.01)
*F25B 31/00* (2006.01)

(52) U.S. Cl.
CPC ............... *F16M 5/00* (2013.01); *F25B 31/00* (2013.01); *F25B 2400/075* (2013.01)

(58) Field of Classification Search
CPC ...... F01C 21/007; F01C 1/0253; F01C 21/10; F16M 5/00; F25B 31/00; F25B 2400/075
See application file for complete search history.

(56) References Cited

U.S. PATENT DOCUMENTS

| | | | | | |
|---|---|---|---|---|---|
| 3,233,852 | A | * | 2/1966 | Azar | A47B 96/027 248/68.1 |
| 3,446,366 | A | * | 5/1969 | Miller | B25H 1/00 182/148 |
| 3,477,668 | A | * | 11/1969 | Tippmann | F16M 5/00 248/346.03 |
| 4,033,531 | A | * | 7/1977 | Levine | H02K 5/26 248/676 |

(Continued)

FOREIGN PATENT DOCUMENTS

CN 1316597 A 10/2001
CN 201972883 U 9/2011

(Continued)

*Primary Examiner* — Eret C McNichols
(74) *Attorney, Agent, or Firm* — McCormick, Paulding & Huber PLLC

(57) ABSTRACT

The disclosure discloses a mounting member including two support rails extending side by side. The two support rails include a first section and a second section in an extension direction thereof. The first section is adapted to carry a device with a first size, and the second section is adapted to carry a device with a second size. Grooves are provided on a top surface of the support rails so as to avoid interference between the bottom surface of the device and the top surface of the support rails. The disclosure also discloses a device assembly including a plurality of devices and the mounting member. The mounting member of the present disclosure allows the plurality of devices to be directly mounted on the two support rails without the need of additional support rails or spacers, thereby reducing the number of parts and improving the integrity and ease of installation of the device assembly.

17 Claims, 5 Drawing Sheets

(56) References Cited

U.S. PATENT DOCUMENTS

| | | | | |
|---|---|---|---|---|
| 4,138,079 | A | * | 2/1979 | Ehret .................. F04D 29/605 248/671 |
| 4,971,275 | A | * | 11/1990 | Roberts .................. B65D 1/36 248/152 |
| 5,058,762 | A | * | 10/1991 | Blaushild .................. G21F 5/14 248/676 |
| 5,277,554 | A | | 1/1994 | Elson |
| D368,648 | S | * | 4/1996 | Losier .................. D8/356 |
| 6,761,541 | B1 | * | 7/2004 | Clendenin .............. F04C 23/00 417/423.15 |
| 6,948,916 | B2 | * | 9/2005 | Hebert .................. F25B 31/02 62/469 |
| 6,983,622 | B2 | * | 1/2006 | De Bernardi ........... F25B 41/40 62/468 |
| 8,002,528 | B2 | * | 8/2011 | Hodapp ............... F01C 21/007 417/410.5 |
| 8,142,175 | B2 | * | 3/2012 | Duppert .............. F04C 23/001 417/363 |
| 8,152,128 | B2 | * | 4/2012 | Asplund ............... F04D 29/669 248/671 |
| 8,960,612 | B2 | * | 2/2015 | McCoy .................. F16L 3/223 248/68.1 |
| 9,181,940 | B2 | * | 11/2015 | Cullen, Jr. .......... F04B 39/0044 |
| 9,203,278 | B2 | * | 12/2015 | Andersson .............. H02K 5/26 |
| 10,072,673 | B2 | * | 9/2018 | Eddie .................. F04C 23/001 |
| 10,168,082 | B2 | * | 1/2019 | Troxell .................. F25B 49/02 |
| 10,288,056 | B2 | * | 5/2019 | Alpha .................. F25B 41/40 |
| 10,359,044 | B2 | * | 7/2019 | Kawano .............. F04C 23/001 |
| 10,830,045 | B2 | * | 11/2020 | Perisse ............... F04C 18/0253 |
| 2009/0185929 | A1 | * | 7/2009 | Duppert ................ F04C 23/008 418/270 |
| 2011/0132853 | A1 | * | 6/2011 | Drobot .................. A47F 5/0853 211/183 |
| 2012/0007457 | A1 | * | 1/2012 | Andersson ............... H02K 5/26 310/91 |
| 2013/0228349 | A1 | * | 9/2013 | Yang .................... A62C 13/78 169/51 |
| 2013/0251550 | A1 | * | 9/2013 | Cullen, Jr. .......... F04B 39/0044 417/321 |
| 2016/0032943 | A1 | * | 2/2016 | Eddie .................. F01C 21/007 220/652 |
| 2018/0320519 | A1 | * | 11/2018 | Perisse .................. F01C 21/02 |
| 2022/0074412 | A1 | * | 3/2022 | Genevois ............ F04C 18/0207 |

FOREIGN PATENT DOCUMENTS

| | | | |
|---|---|---|---|
| CN | 203194052 U | 9/2013 | |
| CN | 203605611 U | 5/2014 | |
| CN | 104061162 A | 9/2014 | |
| CN | 104314788 A | 1/2015 | |
| CN | 204200507 U | 3/2015 | |
| CN | 104567107 A | 4/2015 | |
| CN | 104334882 B | 8/2016 | |
| CN | 205478187 U | 8/2016 | |
| CN | 206144762 U | 5/2017 | |
| CN | 108413189 A | 8/2018 | |
| CN | 108799110 A | 11/2018 | |
| CN | 109028729 A | 12/2018 | |
| DE | 102016001854 A1 * | 9/2016 | ............. F16M 5/00 |
| JP | 2007271117 A | 10/2007 | |
| WO | WO03038278 A3 | 5/2003 | |

\* cited by examiner

MOUNTING MEMBER AND DEVICE ASSEMBLY

CROSS-REFERENCE TO RELATED APPLICATION

This application claims foreign priority benefits under U.S.C. § 119 to Chinese Patent Application No. 201910370177.3 filed on Apr. 30, 2019, the content of which is hereby incorporated by reference in its entirety.

BACKGROUND OF THE DISCLOSURE

Technical Field

Embodiments of the disclosure relate to a mounting member and a device assembly, and more particularly to support rails for mounting compressors in a refrigeration system or an air conditioning system.

Background

FIG. 1 schematically illustrates a mounting way of a compressor assembly in the prior art. As shown in FIG. 1, the compressor assembly comprises two compressors CP1 and CP2 with different external sizes. The two compressors CP1 and CP2 are connected in parallel with each other through pipes 30 and are mounted on two support rails 10 extending side by side. The two support rails 10 are parallel and spaced from each other with equal intervals. A plurality of through holes are provided on the support rails 10 so as to fix the support rails 10 to a foundation (not shown, such as the ground) with fasteners 104 (for example, screws) fitted into the through holes. The external size of the compressor CP1 is larger than the external size of the compressor CP2.

The bottom surface of the larger compressor CP1 can cover the spacing between the two support rails 10, so the compressor CP1 can be directly fastened to the two support rails 10 by utilizing multiple bolts 101 without the need of additional support rails. The external size of the compressor CP2 is smaller and cannot directly cover the spacing between the two support rails 10, so the compressor CP2 needs to be indirectly mounted on the support rails 10 with the aid of two additional support rails 20. Specifically, as shown in FIG. 1, two support rails 20 are provided side by side on the support rails 10 in a direction intersecting with (preferably perpendicular to) the extension direction of the support rails 10, and are fastened to the support rails 10 with a plurality of bolts 203. Then, the compressor CP2 is fastened to the two support rails 20 by a plurality of bolts 201.

In addition, spacers 102 are provided between the mounting feet of the compressor CP1 and a top surface of the support rails 10, and spacers 102 are provided between the mounting feet of the compressor CP2 and the top surface of the support rails 20 in order to adjust (raise) the height position of the compressors CP1 and CP2 in the vertical direction so as to avoid interference between the bottom surface of the compressors CP1 and CP2 and the top surface of the corresponding support rails, which results in that the compressors cannot be mounted on the support rails.

Therefore, the way of mounting the compressor assembly in the prior art is more complicated and the cost is higher due to the need of using additional parts (such as the support rails 20 and the spacers 102 and 202).

SUMMARY

In order to solve the above technical problems, there is provided a mounting member in the disclosure, the mounting member comprises two support rails extending side by side, and the two support rails comprise a first section and a second section in an extension direction thereof. The first section is adapted to carry a first device with a first size, and the second section is adapted to carry a second device with a second size. Grooves are provided on a top surface of the support rails in the first section and/or the second section so as to avoid interference between the bottom surface of the first device and/or the second device and the top surface of the support rails.

The bottom surface of the first device and/or the second device bulges towards the top surface of the support rails, and the shape of the grooves matches the shape of the bottom surface.

A distance between the two support rails in the first section is a first distance. A distance between the two support rails in the second section is a second distance, and the first distance is equal to or greater than the second distance.

Each of the support rails is an integrally formed member. The width of each of the support rails in the first section is equal to or smaller than the width of each of the support rails in the second section in a direction perpendicular to an extension direction of the support rails.

Bolt holes are provided on the support rails to fasten the first device and the second device to the support rails with the bolts fitted into the bolt holes.

Through holes are provided on the support rails, so that the support rails are fixed to the foundation with fasteners fitted into the through holes.

The two support rails further comprise a third section in an extension direction thereof, and the third section is adjacent to the first section or the second section. A distance between the two support rails in the third section is a third distance, so that the third section is adapted to carry a third device with a third size.

Grooves are provided on a top surface of the support rails in the third section so as to avoid interference between a bottom surface of the third device and the top surface of the support rails.

The third distance is equal to the first distance or equal to the second distance.

There is also provided a device assembly in present disclosure, which comprises a plurality of devices and a mounting member as described above. The plurality of devices comprise at least the first device and the second device, and the plurality of devices are directly mounted on the two support rails without the need of additional support rails or spacers. The plurality of devices are refrigeration compressors and are connected in series or in parallel to each other through pipes.

By adopting the above technical solution, the present disclosure reduces the number of parts and improves the integrity and ease of installation of the device assembly.

BRIEF DESCRIPTION OF THE DRAWINGS

To facilitate understanding of the present disclosure, the present disclosure is described in more detail below based on exemplary embodiments in conjunction with the accompanying drawings. The same or similar reference numerals are used in the accompanying drawings to represent the same or similar components. It should be understood that the accompanying drawings are only schematic, and the dimensions and scales of the components in the accompanying drawings are not necessarily accurate.

DETAILED DESCRIPTION

Figure 2:
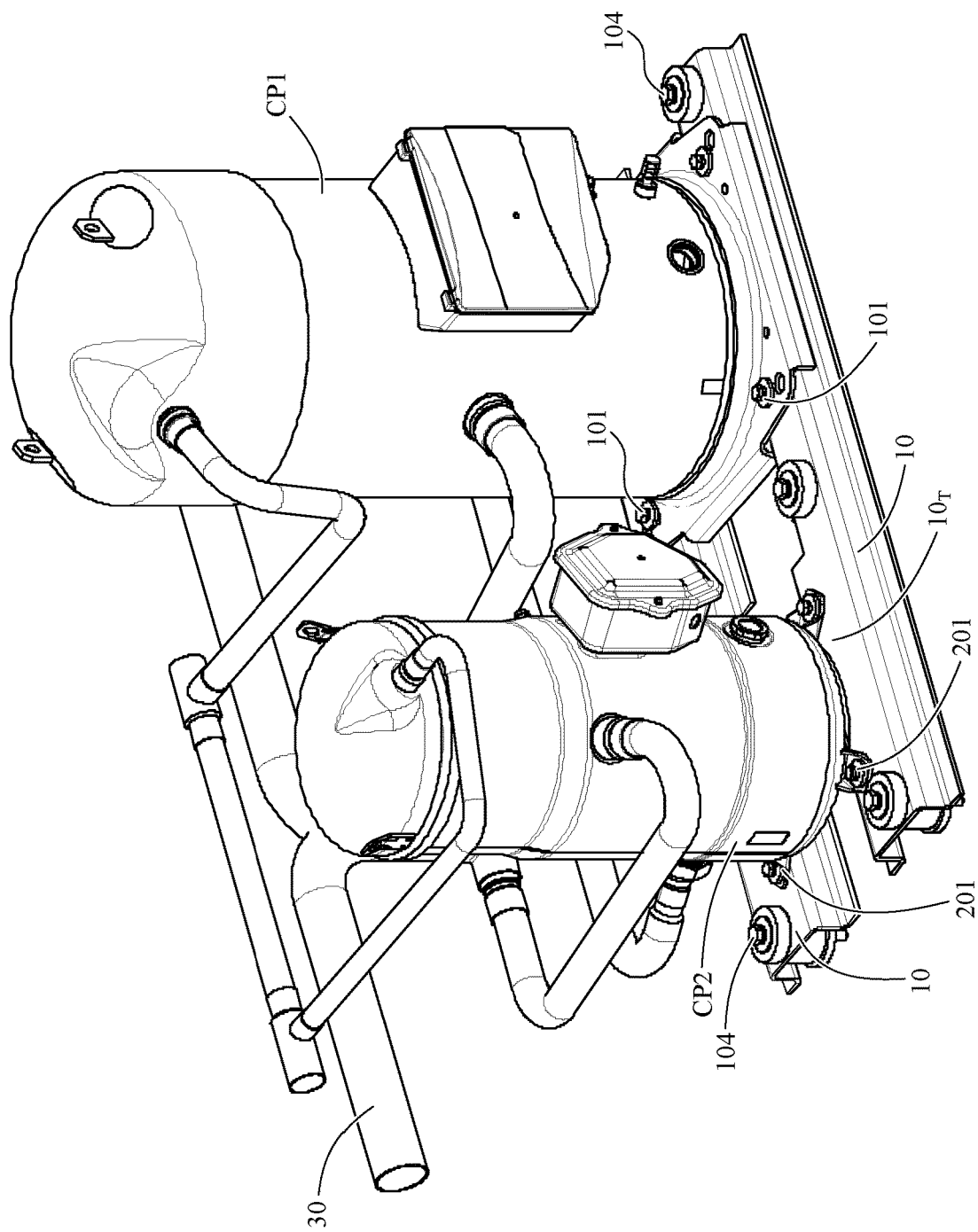
FIG. 2 is a schematic diagram of a mounting way of a compressor assembly according to an embodiment of the present disclosure.

FIG. 2 is a schematic diagram of a way of mounting a compressor assembly according to an embodiment of the present disclosure.

As shown in FIG. 2, the compressor assembly comprises two compressors CP1 and CP2 of different sizes. The two compressors CP1 and CP2 are connected in parallel to each other through pipes 30 and mounted on two support rails 10 extending side by side. That is, the two support rails 10 are parallel to each other. In other embodiments, the two compressors CP1 and CP2 may also be connected in series with each other through pipes 30 and mounted on the support rails 10. The support rails 10 are fixed to a foundation (not shown, such as the ground) with a plurality of fasteners 104 (such as screws). The size of the compressor CP1 is larger than the size of the compressor CP2. The compressor CP1 is fastened to the two support rails 10 with a plurality of bolts 101. The compressor CP2 is fastened to the two support rails 10 with a plurality of bolts 201.

Figure 1:
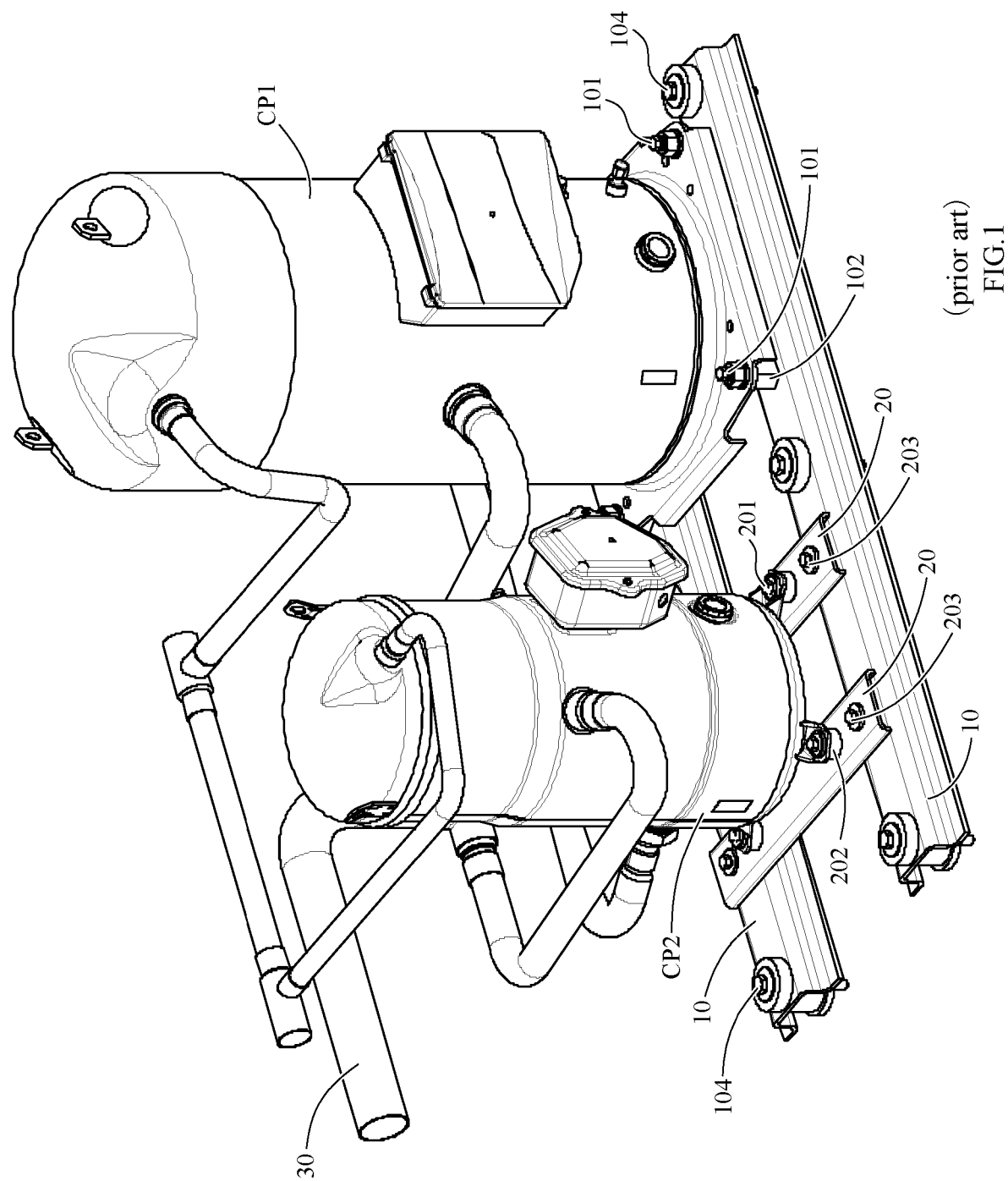
FIG. 1 is a schematic diagram of a mounting way of a compressor assembly in the prior art.

The way of mounting the compressor assembly in FIG. 2 is different from the way of mounting the compressor assembly in FIG. 1 in that the compressors CP1 and CP2 in FIG. 2 can be mounted on the support rails 10 without the need of additional support rails (for example, the support rails 20 in the prior art shown in FIG. 1) and the spacers (for example, the spacers 102 and 202 in the prior art shown in FIG. 1).

Figure 3:
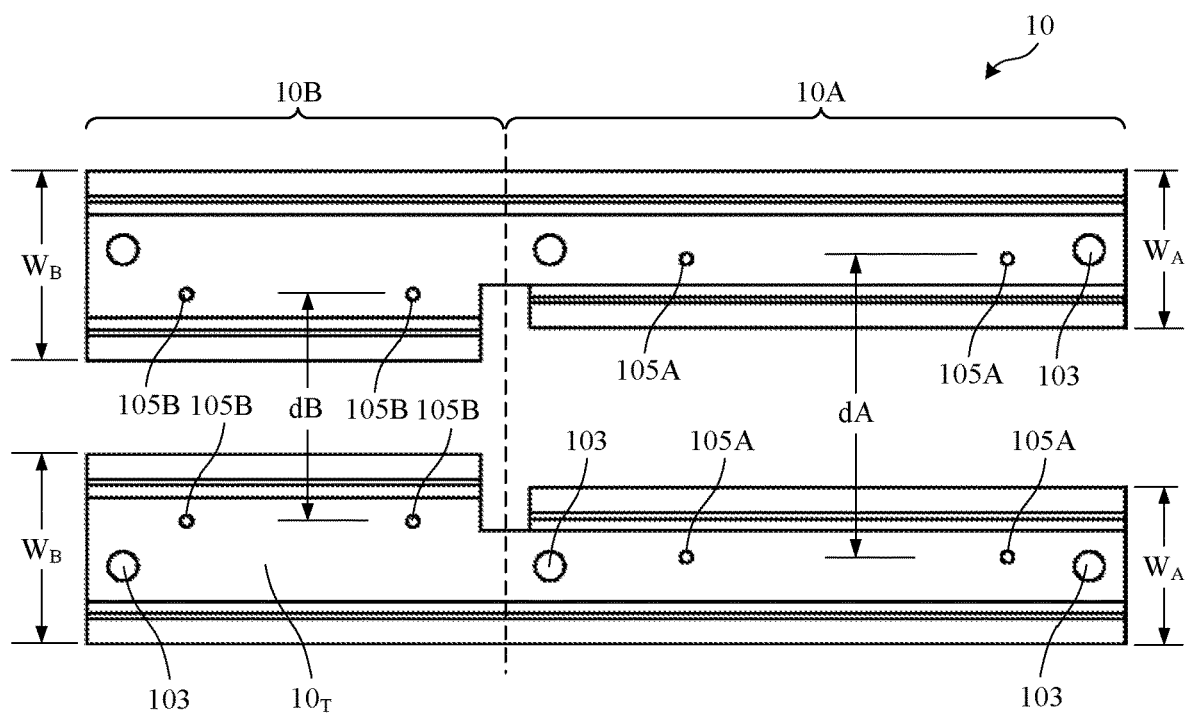
FIG. 3 is a top view of a mounting member according to an embodiment of the present disclosure.

FIG. 3 is a top view of a mounting member according to an embodiment of the present disclosure.

As shown in FIG. 3, the mounting member according to the embodiment of the present disclosure comprises two support rails 10 extending side by side. That is, the two support rails 10 extend parallel to each other. Each of the support rails 10 is an integrally formed member. For example, the support rails 10 can be made by performing process such as sheet metal processing or press forming on a metal sheet.

As shown in FIG. 3, the two support rails 10 can be divided into a first section 10A and a second section 10B in the extension direction of the two support rails. The first section 10A is adapted to carry a first device with a first size, such as a compressor CP1. The second section 10B is adapted to carry a second device with a second size, such as a compressor CP2.

As an example, the first size may be the distance between a mounting point of the first device on one support rail 10 (such as at one bolt 101 shown in FIG. 2) and a mounting point on the other support rail 10 (such as at the other bolt 101 shown in FIG. 2) in a direction perpendicular to the extension direction of the support rails 10, for example, the distance between the bolts 101 on the two support rails 10 shown in FIG. 2, and the second size is the distance between a mounting point of the second device on one support rail 10 (such as at one bolt 201 shown in FIG. 2) and a mounting point on the other support rail 10 (such as at the other bolt 201 shown in FIG. 2) in a direction perpendicular to the extension direction of the support rails 10, for example, a distance between the bolts 201 on the two support rails 10 shown in FIG. 2. The first size may be the same as or different from the second size.

The distance between the two support rails 10 in the first section 10A is a first distance dA. The distance between the two support rails 10 in the second section 10B is a second distance dB. The first distance dA may be the same with or different from the second distance dB depending on whether the first size is the same with or different from the second size. That is, when the first size is the same with the second size, the first distance dA is equal to the second distance dB; when the first size is different from the second size, the first distance dA is different from the second distance dB. That is, in different embodiments, the first distance dA may be equal to, or greater than, or less than the second distance dB. In FIG. 3, the first distance dA is shown as being different from the second distance dB, and the first distance dA is greater than the second distance dB. Accordingly, the width $W_A$ of each of the support rails 10 in the first section 10A is smaller than the width $W_B$ of each of the support rails 10 in the second section 10B in a direction perpendicular to the extension direction of the support rails 10.

Specifically, two bolt holes 105A are provided on each of the support rails 10 in the first section 10A so as to fasten the first device (such as the compressor CP1) onto the support rails 10 with the bolts 101 fitted into the bolt holes 105A. Similarly, two bolt holes 105B are provided on each of the support rails 10 in the second section 10B so as to fasten the second device (such as the compressor CP2) onto the support rails 10 with the bolts 201 fitted into the bolt holes 105B.

As shown in FIG. 3, the distance dA between the bolt hole 105A on one support rail 10 and the bolt hole 105A on the other support rail 10 is greater than the distance dB between the bolt hole 105B on one support rail 10 and the bolt hole 105B on the other support rail 10 in a direction perpendicular to the extension direction of the support rails 10. Therefore, the first section 10A is adapted to carry a first device with a larger size, and the second section 10B is adapted to carry a second device with a smaller external size. In addition, a plurality of through holes 103 are provided on the support rails 10 so as to fix the support rails 10 to a foundation (not shown, for example, the ground) with fasteners 104 fitted into the through holes 103.

Figure 4:
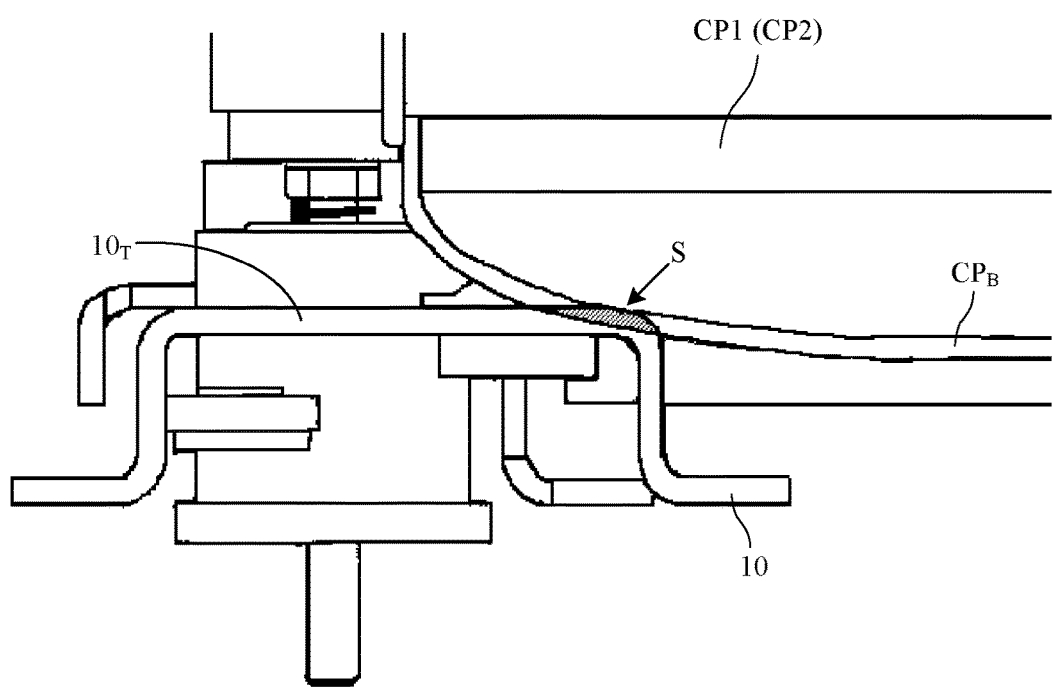
FIG. 4 is a schematic cross-sectional view of the interference between the bottom surface of a compressor and the top surface of the support rails.

FIG. 4 is a schematic cross-sectional view of a case where the bottom surface of a compressor interferes with the top surface of the support rails taken along a plane perpendicular to the extension direction of the support rails.

As shown in FIG. 4, the cross section of the support rails 10 is generally of '⌐⌐' shape. Take the first device as the compressor CP1 and the second device as the compressor CP2 as an example, in some cases, the bottom surface $CP_B$ of the compressor CP1 and/or the compressor CP2 bulges downwards, that is, bulges towards the top surface $10_T$ of the support rails 10. When the compressor assembly CP1, CP2 are placed on the support rails 10 for installation, the bottom surface $CP_B$ of the compressor CP1 and/or the compressor CP2 may interfere with the top surface $10_T$ of the corresponding support rails 10 in the case of the spacers (such as spacers 102 and/or spacers 202) are not used to raise the height position of the compressors CP1 and/or CP2 in the vertical position, as shown by the shaded area S in FIG. 4.

Figure 5:
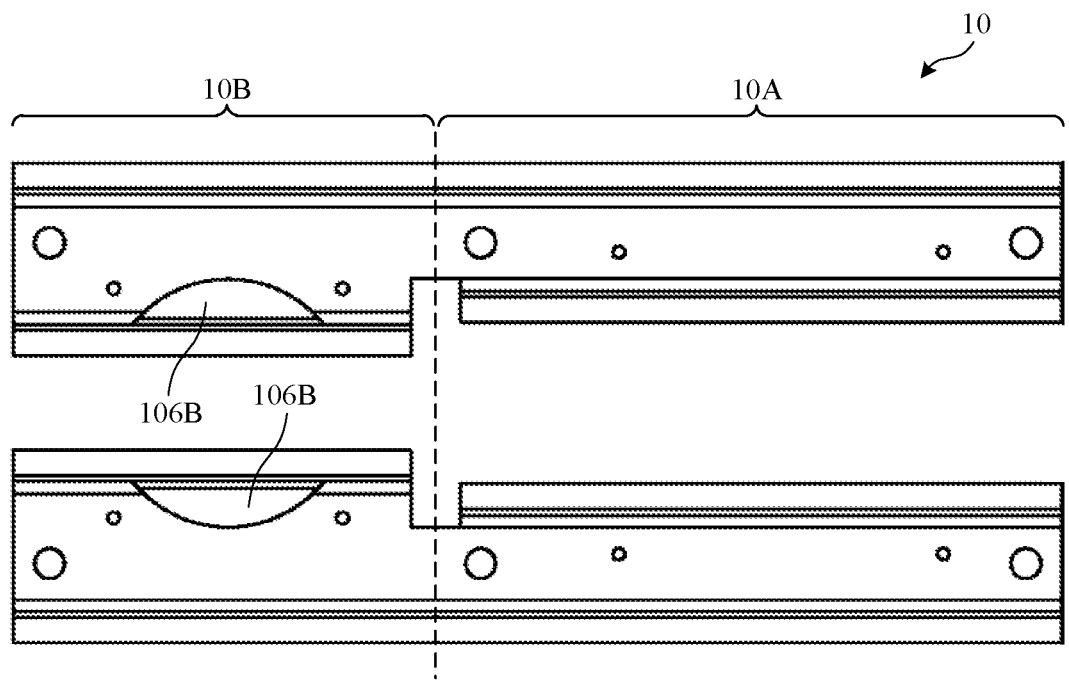
FIGS. 5 to 8 are top views of mounting members according to other embodiments of the present disclosure.
Figure 6:
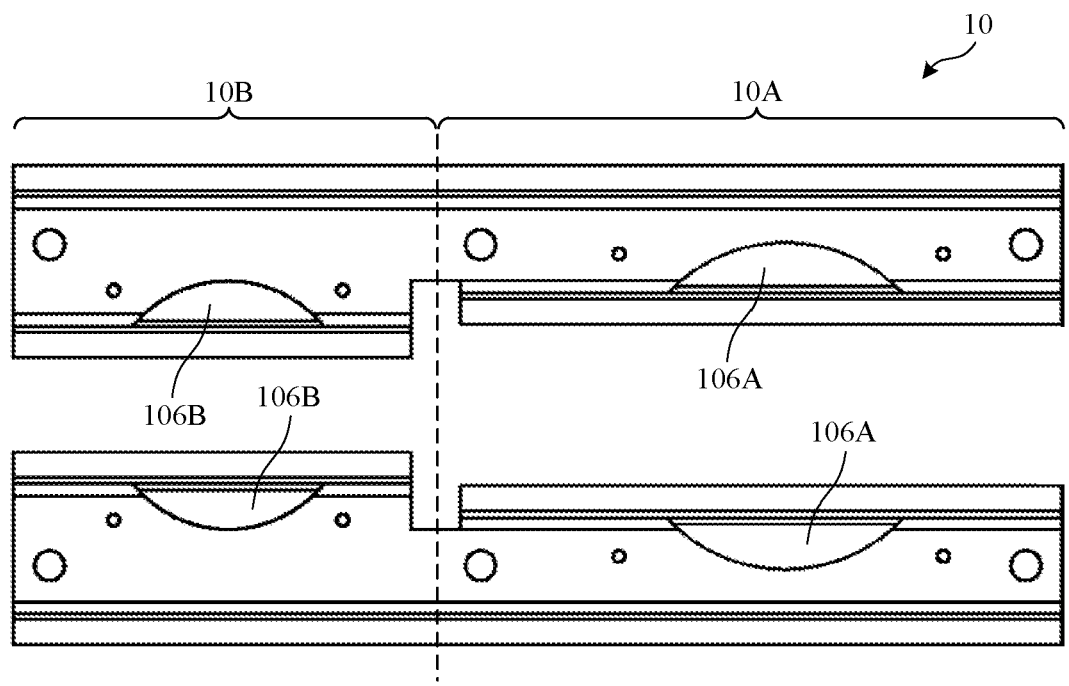

FIGS. 5 and 6 are top views of mounting members according to other embodiments of the present disclosure.

As shown in FIGS. 5 and 6, in order to avoid the above-mentioned interference, grooves 106A and/or grooves 106B are provided on a top surface $10_T$ of the support rails 10 in the first section 10A and/or the second section 10B and the shape of the grooves 106A, 106B matches the shape of the corresponding bottom surface $CP_B$. Whether the grooves 106A and/or the grooves 106B are provided depends on whether the bottom surface $CP_B$ of the supported device and the top surface $10_T$ of the corresponding support rails 10 will interfere with each other or not. It can be understood that in the case where the interference does not occur even without a spacer, there is no need to provide the grooves 106A and/or the grooves 106B, as shown in FIG. 3. FIG. 5 shows a case where only the grooves 106B are provided, and FIG. 6 shows a case where the grooves 106A and the grooves 106B are provided at the same time.

Figure 7:
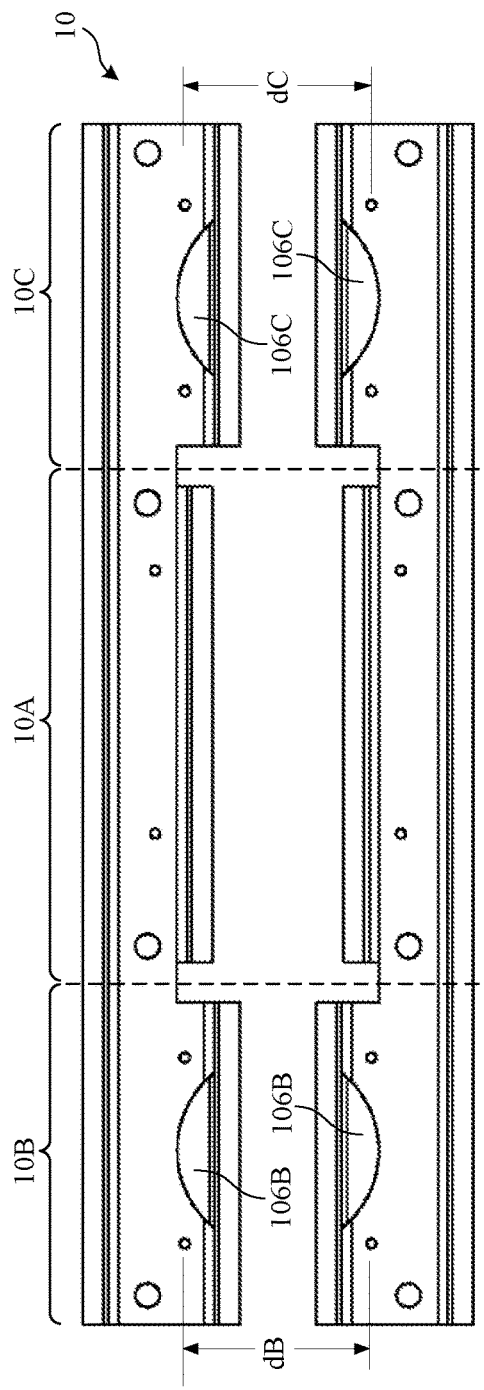
Figure 8:
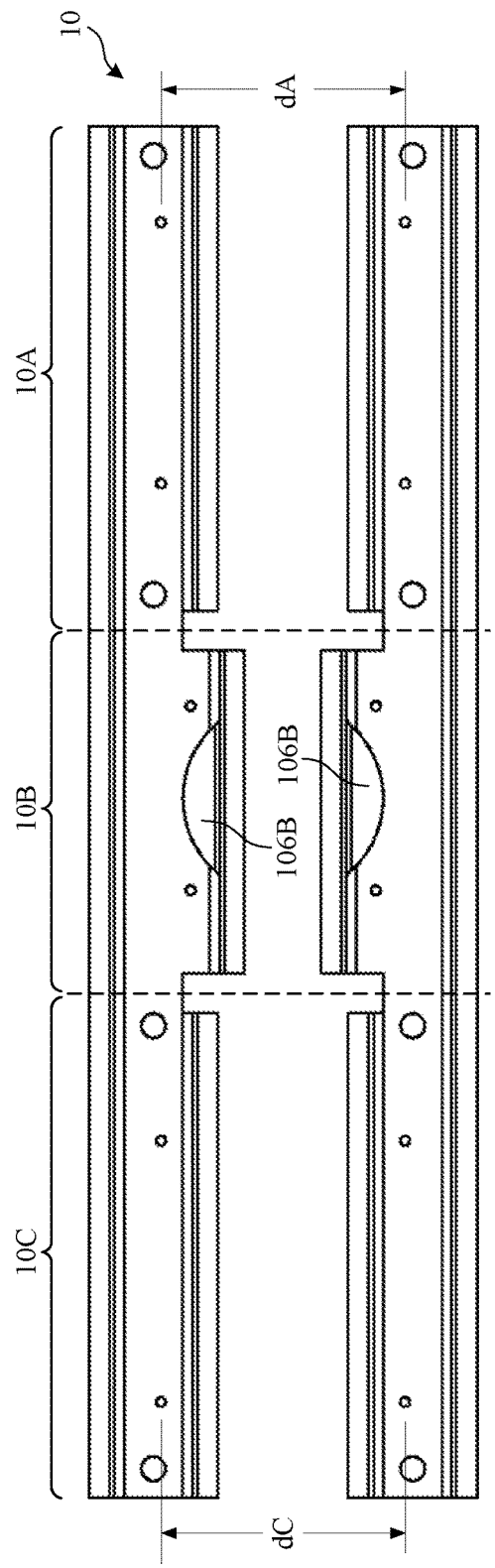

FIGS. 7 and 8 are top views of mounting members according to other embodiments of the present disclosure.

As shown in FIGS. 7 and 8, the two support rails 10 further comprise a third section 10C in the extension direction thereof. The third section 10C is adjacent to the first section 10A or the second section 10B. The configuration of the two support rails 10 in the third section 10C is substantially the same with the overall configuration of the support rails 10 in the first section 10A or the second section 10B, so that the third section 10C is adapted to carry a third device (e.g., a compressor) with a third size. Similarly, the distance between the two support rails 10 in the third section 10C is a third distance dC, which may be the same with or different from the aforementioned first distance dA and the second distance dB depending on whether the third size of the third device is the same with or different from the first size of the first device and the second size of the second device. In addition, grooves 106C may be provided on a top surface of the support rails 10 in the third section 10C so as to avoid interference between a bottom surface of the third device and the top surface of the support rails 10 according to the actual situation. FIG. 7 shows a case where grooves 106C are provided and the third distance dC is equal to the second distance dB, and FIG. 8 shows a case where no grooves 106C are provided and the third distance dC is equal to the first distance dA.

It should be noted that the device assembly supported by the two support rails 10 extending in parallel in the above description all take the compressor assembly as an example. However, in other embodiments, the device assembly may be other different devices as long as it can be mounted on the support rails 10 according to the present disclosure. The bottom surface of the supported device bulges downwards when grooves are provided on the support rails 10, which eliminates the interference between the bottom surface of the supported device and the top surface of the support rails 10, thereby facilitating the installation of the device assembly on the support rails 10.

The technical objectives, technical solutions, and technical effects of the present disclosure have been described in detail above with reference to specific embodiments. It should be understood that the above-mentioned embodiments are merely exemplary and not restrictive. Any modification, equivalent replacement, and improvement made by those skilled in the art are comprised in the protection scope of the present disclosure within the spirit and principle of the present disclosure.

What is claimed is:

1. A mounting member for mounting refrigeration compressors and comprising two support rails extending side by side, the two support rails comprising a first section and a second section in an extension direction thereof, wherein
the first section is adapted to carry a first refrigeration compressor with a first size, and the second section is adapted to carry a second refrigeration compressor with a second size, and
grooves are provided on a top surface of the support rails in at least one of the first section and the second section so as to avoid interference between a bottom surface of the at least one of the first refrigeration compressor and the second refrigeration compressor and the top surface of the support rails,
wherein a distance between the two support rails in the first section is a first distance; a distance between the two support rails in the second section is a second distance, and the first distance is greater than the second distance.

2. The mounting member according to claim 1, wherein the bottom surface of the at least one of the first refrigeration compressor and the second refrigeration compressor bulges towards the top surface of the support rails, and the shape of the grooves matches the shape of the bottom surface.

3. A refrigeration compressor assembly comprising a plurality of refrigeration compressors and a mounting member according to claim 2,
wherein the plurality of refrigeration compressors comprise at least a first refrigeration compressor and a second refrigeration compressor, and the plurality of refrigeration compressors are directly mounted on the two support rails without the need of additional support rails or spacer.

4. The mounting member according to claim 1, wherein each of the support rails is an integrally formed member, and the width of each of the support rails in the first section is equal to or smaller than the width of each of the support rails in the second section in a direction perpendicular to the extension direction of the support rails.

5. A refrigeration compressor assembly comprising a plurality of refrigeration compressors and a mounting member according to claim 4,
wherein the plurality of refrigeration compressors comprise at least a first refrigeration compressor and a second refrigeration compressor, and the plurality of refrigeration compressors are directly mounted on the two support rails without the need of additional support rails or spacer.

6. The mounting member according to claim 1, wherein bolt holes are provided on the support rails so as to utilize bolts fitted into the bolt holes to fasten the first refrigeration compressor and the second refrigeration compressor onto the support rails, and wherein a distance between a pair of bolt holes for the first refrigeration compressor is greater than a distance between a pair of bolt holes for the second refrigeration compressor, wherein each pair of bolt holes includes a first bolt hole on one support rail and a second bolt hole on the other support rail.

7. A refrigeration compressor assembly comprising a plurality of refrigeration compressors and a mounting member according to claim 6,
wherein the plurality of refrigeration compressors comprise at least a first refrigeration compressor and a second refrigeration compressor, and the plurality of refrigeration compressors are directly mounted on the two support rails without the need of additional support rails or spacer.

8. The mounting member according to claim 1, wherein through holes are provided on the support rails so as to fix the support rails to a foundation by fasteners fitted into the through holes.

9. A refrigeration compressor assembly comprising a plurality of refrigeration compressors and a mounting member according to claim 8,
wherein the plurality of refrigeration compressors comprise at least a first refrigeration compressor and a second refrigeration compressor, and the plurality of refrigeration compressors are directly mounted on the two support rails without the need of additional support rails or spacer.

10. The mounting member according to claim 1, wherein the two support rails further comprise a third section in the extension direction thereof, and the third section is adjacent to the first section or the second section,
a distance between the two support rails in the third section is a third distance so that the third section is adapted to carry a third refrigeration compressor with a third size.

11. The mounting member according to claim 10, wherein grooves are provided on a top surface of the support rails in the third section so as to avoid interference between a bottom surface of the third refrigeration compressor and the top surface of the support rails.

12. A refrigeration compressor assembly comprising a plurality of refrigeration compressors and a mounting member according to claim 11,
wherein the plurality of refrigeration compressor comprise at least a first refrigeration compressor and a second refrigeration compressor, and the plurality of refrigeration compressor are directly mounted on the two support rails without the need of additional support rails or spacer.

13. The mounting member according to claim 10, wherein the third distance is equal to the first distance or equal to the second distance.

14. A refrigeration compressor assembly comprising a plurality of refrigeration compressors and a mounting member according to claim 13,
wherein the plurality of refrigeration compressors comprise at least a first refrigeration compressor and a second refrigeration compressor, and the plurality of refrigeration compressors are directly mounted on the two support rails without the need of additional support rails or spacer.

15. A refrigeration compressor assembly comprising a plurality of refrigeration compressors and a mounting member according to claim 10,
wherein the plurality of refrigeration compressors comprise at least a first refrigeration compressor and a second refrigeration compressor, and the plurality of refrigeration compressors are directly mounted on the two support rails without the need of additional support rails or spacer.

16. A refrigeration compressor assembly comprising a plurality of refrigeration compressors and a mounting member according to claim 1, wherein the plurality of refrigeration compressors comprise at least a first refrigeration compressor and a second refrigeration compressor, and the plurality of refrigeration compressors are directly mounted on the two support rails without the need of additional support rails or spacer.

17. The refrigeration compressor assembly according to claim 16, wherein the plurality of refrigeration compressors are connected in series or in parallel to each other through pipes.

* * * * *